United States Patent
Takii

(10) Patent No.: US 10,421,497 B2
(45) Date of Patent: Sep. 24, 2019

(54) VEHICLE FRONT SECTION STRUCTURE AND VEHICLE BODY MODULAR STRUCTURE

(71) Applicant: TOYOTA JIDOSHA KABUSHIKI KAISHA, Toyota-shi, Aichi-ken (JP)

(72) Inventor: Shunsuke Takii, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/984,725

(22) Filed: May 21, 2018

(65) Prior Publication Data

US 2018/0370575 A1    Dec. 27, 2018

(30) Foreign Application Priority Data

Jun. 26, 2017    (JP) ................ 2017-124407

(51) Int. Cl.
| | | |
|---|---|---|
| B62D 25/08 | (2006.01) | |
| B62D 25/04 | (2006.01) | |
| B60R 21/34 | (2011.01) | |

(52) U.S. Cl.
CPC ............ B62D 25/081 (2013.01); B60R 21/34 (2013.01); B62D 25/04 (2013.01); *B60R 2021/343* (2013.01)

(58) Field of Classification Search
CPC ........ B62D 25/081; B62D 25/04; B60R 21/34
USPC ........................................................ 296/192
See application file for complete search history.

(56) References Cited

U.S. PATENT DOCUMENTS

| | | | | |
|---|---|---|---|---|
| 5,992,925 | A   * | 11/1999 | Alberici ............... | B62D 25/081 |
| | | | | 280/779 |
| 6,193,304 | B1 * | 2/2001 | Takahashi ............. | B60J 1/02 |
| | | | | 296/187.04 |
| 2006/0108837 | A1 | 5/2006 | Deme et al. | |
| 2015/0028629 | A1 * | 1/2015 | Sasaki .................. | B62D 25/081 |
| | | | | 296/192 |
| 2015/0232128 | A1 * | 8/2015 | Naoi ..................... | B62D 25/145 |
| | | | | 296/187.09 |
| 2016/0375855 | A1 * | 12/2016 | Hausler ................. | B62D 25/081 |
| | | | | 296/187.04 |
| 2017/0057554 | A1 * | 3/2017 | Nakamoto ........... | B62D 25/081 |
| 2018/0265134 | A1 * | 9/2018 | Tomiki ................. | B62D 21/152 |
| 2019/0002032 | A1 * | 1/2019 | Takii ..................... | B62D 25/04 |

FOREIGN PATENT DOCUMENTS

| | | |
|---|---|---|
| JP | 2003-063447 A | 3/2003 |
| JP | 2004-299633 A | 10/2004 |
| JP | 2006-143198 A | 6/2006 |
| JP | 2009-090928 A | 4/2009 |

* cited by examiner

*Primary Examiner* — Jason S Morrow
(74) *Attorney, Agent, or Firm* — Oliff PLC

(57) ABSTRACT

There is provided a vehicle front section structure including: a cowl top panel that extends in a vehicle width direction along a lower portion of a windshield glass, that supports the windshield glass, and that has an open cross-section structure; and a cowl reinforcement that is joined to both a lower portion of the cowl top panel and an upper portion of a dash panel, that extends in the vehicle width direction, and that has a closed cross-section structure.

8 Claims, 6 Drawing Sheets

VEHICLE FRONT SECTION STRUCTURE AND VEHICLE BODY MODULAR STRUCTURE

CROSS-REFERENCE TO RELATED APPLICATION

This application is based on and claims priority under 35 USC 119 from Japanese Patent Application No. 2017-124407 filed on Jun. 26, 2017, the disclosure of which is incorporated by reference herein.

BACKGROUND

Technical Field

The present disclosure relates to a vehicle front section structure and a vehicle body modular structure.

Related Art

Japanese Patent Application Laid-Open (JP-A) No. 2004-299633 discloses an automotive front body structure provided with cowl reinforcement spanning between upper portions of a pair of pillars, a dash panel, provided so as to cover a location surrounded by a front edge of a floor, the pillars, and the cowl reinforcement, and a pair of kick-ups extending downward along the dash panel and the floor from rear ends of a pair of front side frames. In this front body structure, a reinforcement member extending in a vertical direction is provided so as to couple at least one of the pair of kick-ups to the cowl reinforcement in order to suppress the dash panel from moving toward the rear in a frontal vehicle collision.

JP-A No. 2009-90928 discloses a vehicle cowl-peripheral structure, in which a closed cross-section portion is provided by joining a cowl lower panel and a cowl upper panel together such that local portions thereof have a closed cross-section. The closed cross-section portion is provided at a vehicle upper side of cowl reinforcement.

In this vehicle cowl-peripheral structure, the closed cross-section portion that supports a lower end of a windshield glass undergoes compression deformation in a vehicle vertical direction when collision load is input to the lower end of the windshield glass. This thereby enables energy to be absorbed in a collision with the head of a pedestrian or the like.

The structures disclosed in JP-A Nos. 2004-299633 and 2009-90928 leave room for improvement from the perspective of securing body rigidity while also improving pedestrian protection performance.

SUMMARY

An object of the present disclosure is to provide a vehicle front section structure capable of securing body rigidity while also improving pedestrian protection performance.

A vehicle front section structure of a first aspect includes a cowl top panel and a cowl reinforcement. The cowl top panel extends in a vehicle width direction along a lower portion of a windshield glass, supports the windshield glass, and has an open cross-section structure. The cowl reinforcement is joined to both a lower portion of the cowl top panel and an upper portion of a dash panel, extends in the vehicle width direction, and has a closed cross-section structure.

The vehicle front section structure of the first aspect is configured by, in sequence from the top of the vehicle downward, the windshield glass, the cowl top panel, the cowl reinforcement, and the dash panel. Accordingly, in this vehicle front section structure, the windshield glass is not supported directly by the cowl reinforcement that has a closed cross-section structure, but is supported by the cowl top panel that has an open cross-section structure. Note that the cowl top panel may be configured with a closed cross-section portion in combination with a reinforcement panel by joining the reinforcement panel to the cowl top panel at a portion in the vehicle width direction. In the vehicle front section structure of the first aspect, the cowl reinforcement that has a closed cross-section structure enables body rigidity to be secured. Moreover, coupling the cowl top panel that has an open cross-section structure between the cowl reinforcement and the windshield glass enables the cowl top panel to undergo compression deformation when collision load acts on the windshield glass in the vehicle downward direction. Namely, the cowl top panel that has an open cross-section structure enables collision energy to be absorbed over the distance from the windshield glass to the cowl reinforcement when, for example, the head of a pedestrian or the like collides with the lower portion of the windshield glass.

In a vehicle front section structure of a second aspect, the cowl reinforcement is configured by an extruded aluminum member.

The vehicle front section structure of the second aspect enables a closed cross-section to be configured without providing joining flanges or the like, in contrast to cases in which cowl reinforcement is formed with a closed cross-section structure by combining panels together. Namely, forming the cowl reinforcement having a closed cross-section structure from aluminum, which has a lighter specific weight than steel, enables a reduction in weight to be achieved.

A vehicle front section structure of a third aspect further includes a joining member that configures a front pillar, that is joined to a vehicle width direction end of the cowl reinforcement, and that is made from die-cast aluminum.

In the vehicle front section structure of the third aspect, the front pillar is configured including the die-cast aluminum joining member. The joining member may, for example, be provided as a member employed to couple a front pillar upper and a front pillar lower together. The vehicle front section structure of the third aspect enables load acting on the cowl reinforcement to be borne by the die-cast aluminum joining member. Namely, this enables load borne by the cowl reinforcement to be better dispersed into the front pillar than in cases in which cowl reinforcement is joined to a front pillar formed simply by combining panels together.

In a vehicle front section structure of a fourth aspect, the joining member includes an extension portion extending toward the vehicle width direction inner side and having a U-shaped cross-section profile, and a wall of the cowl reinforcement is fixed to the extension portion in an abutted state.

In the vehicle front section structure of the fourth aspect, the cowl reinforcement and the extension portion are fixed together by inserting the cowl reinforcement into the extension portion, or by inserting the extension portion into the cowl reinforcement. In the vehicle front section structure of the fourth aspect, a portion where the cowl reinforcement and the joining member overlap is provided at the joining portion of the cowl reinforcement and the joining member, thereby suppressing deformation of the joining portion, where load is liable to concentrate.

The present disclosure is able to provide a vehicle front section structure capable of securing body rigidity while also improving pedestrian protection performance.

BRIEF DESCRIPTION OF THE DRAWINGS

Exemplary embodiments of the present disclosure will be described in detail based on the following figures, wherein.

DETAILED DESCRIPTION

Figure 1:
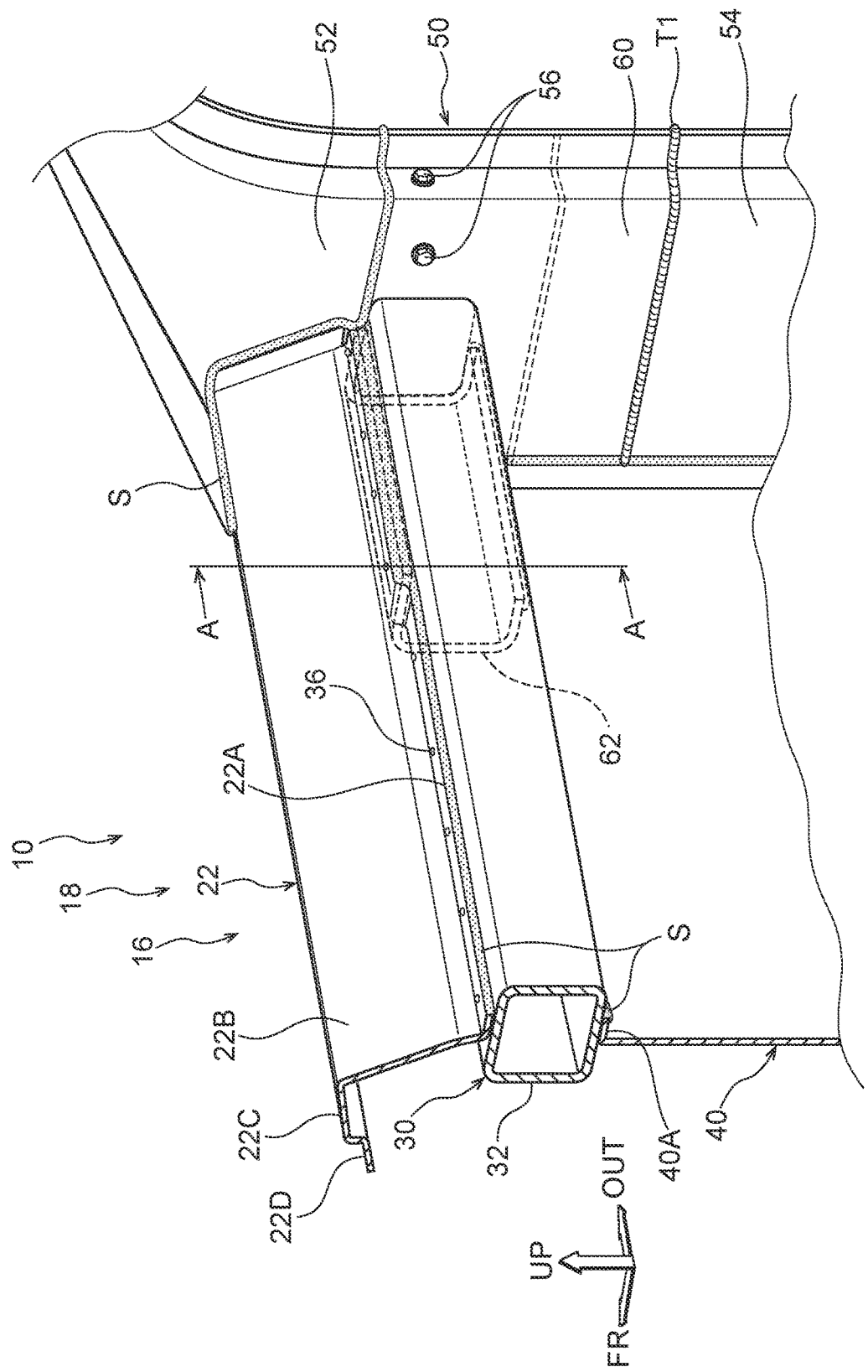
FIG. 1 is a perspective view illustrating a cowl section of a vehicle front section structure according to an exemplary embodiment of the present disclosure, as viewed from the vehicle width direction inner side and vehicle rear.
Figure 2:
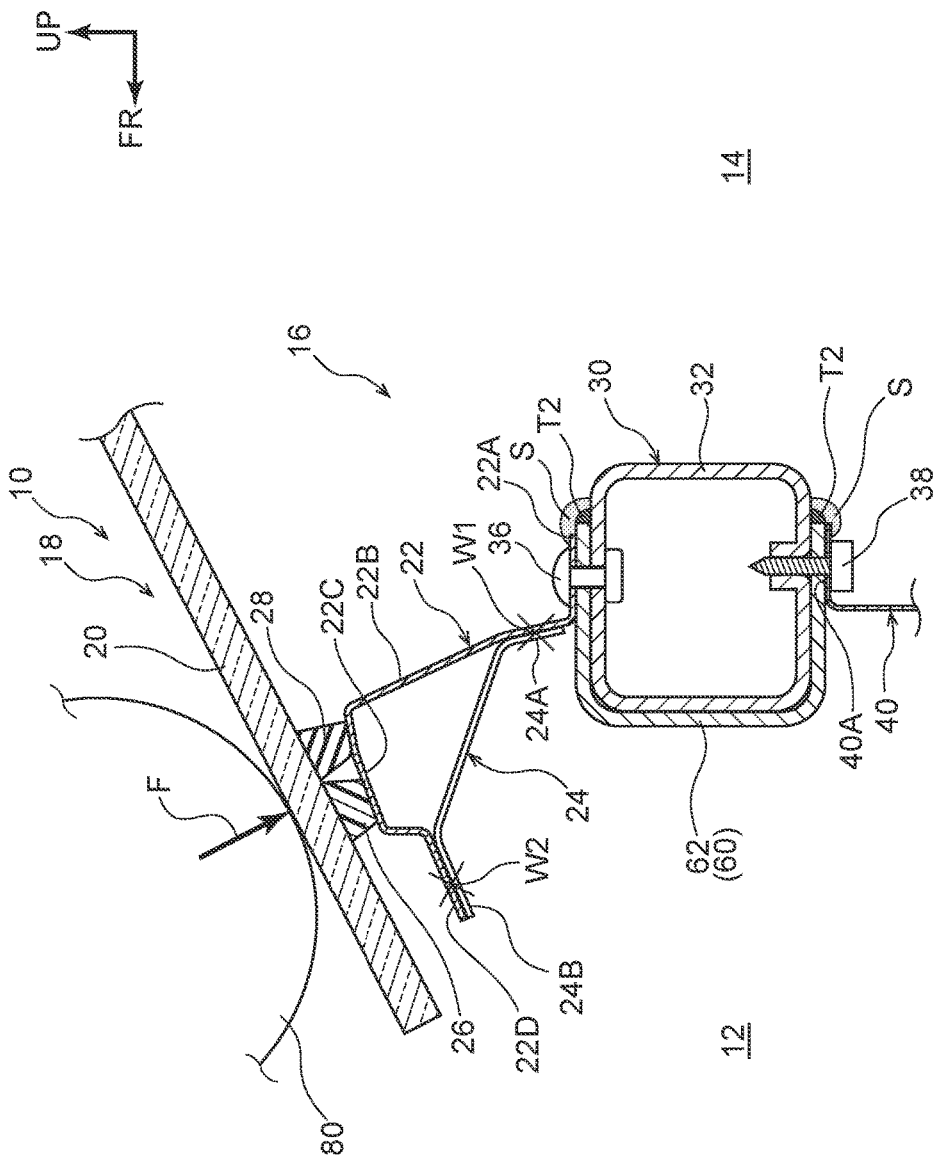
FIG. 2 is a side view cross-section (a cross-section taken along A-A in FIG. 1) of a cowl section of a vehicle front section structure according to an exemplary embodiment of the present disclosure.
Figure 3:
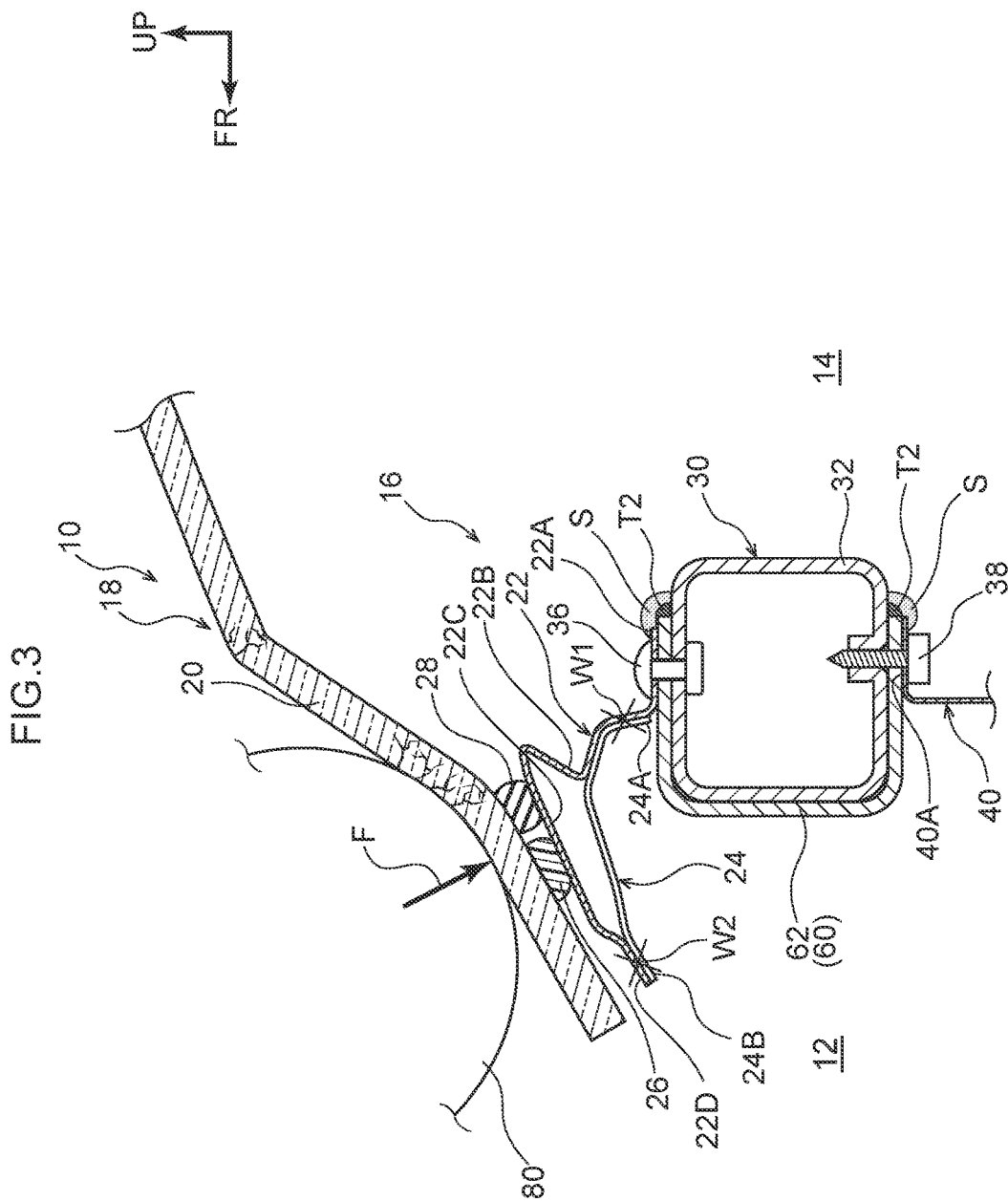
FIG. 3 is a side view cross-section (a cross-section corresponding to FIG. 2) illustrating operation of a vehicle front section structure according to an exemplary embodiment of the present disclosure.

Explanation follows regarding a vehicle front section structure according to an exemplary embodiment of the present disclosure, with reference to FIG. 1 to FIG. 3. In each of the drawings, the arrow FR indicates a vehicle front direction, the arrow UP indicates a vehicle upward direction, and the arrow OUT indicates a vehicle width direction outer side. A front section of a vehicle is configured with basic left-right symmetry, and so only the right of the vehicle is illustrated and described.

FIG. 1 and FIG. 2 illustrate a cowl section 16 of a vehicle 10 applied with a vehicle front section structure 18. Note that windshield glass 20 is omitted from illustration in FIG. 1. The cowl section 16 of the vehicle 10 is provided between front pillars 50 at both vehicle width direction ends of the cowl section 16. As illustrated in FIG. 1 and FIG. 2, the cowl section 16 is configured including a cowl top panel 22 that supports the windshield glass 20, and a cowl reinforcement 30 that is joined to a vehicle lower side of the cowl top panel 22. A dash panel 40 that partitions a front vehicle compartment 12 from a vehicle cabin 14 (see FIG. 2) is joined to the vehicle lower side of the cowl reinforcement 30. The front vehicle compartment 12 includes an engine compartment in which an internal combustion engine is housed, and a space in which a drive source, such as a motor for an electric vehicle, is housed. The cowl top panel 22, the cowl reinforcement 30, and the dash panel 40 extend along the vehicle width direction, and are linked to the front pillars 50 at both vehicle width direction ends.

As illustrated in FIG. 1, each front pillar 50 is configured including a front pillar upper (pillar upper) 52, and a front pillar lower (pillar lower) 54. The front pillar upper 52 and the front pillar lower 54 are joined together by a die-cast aluminum joining member 60. More specifically, the front pillar upper 52 is a framework member formed by joining together a pillar outer upper on the vehicle width direction outer side and a pillar inner upper on the vehicle width direction inner side by spot welding or the like. The front pillar upper 52 has a closed cross-section. The front pillar upper 52 is fixed to the joining member 60 by inserting the front pillar upper 52 into an opening (not illustrated in the drawings) at a vehicle upper side of the joining member 60 and fastening the front pillar upper 52 thereto using bolts 56. The front pillar lower 54 is a framework member formed by joining together a pillar outer lower on the vehicle width direction outer side and a pillar inner lower on the vehicle width direction inner side by spot welding or the like. The front pillar lower 54 has a closed cross-section. The front pillar lower 54 is inserted into an opening (not illustrated in the drawings) at a vehicle lower side of the joining member 60 and fixed to the joining member 60 by welding. An arc-welded weld portion T1 is thus formed at a step formed by an outer wall face of the front pillar lower 54 and an end face of the joining member 60.

The joining member 60 includes an extension portion 62 that extends toward the vehicle width direction inner side and that has a U-shaped cross-section profile as viewed from the vehicle width direction inner side. More specifically, the extension portion 62 includes wall faces at a vehicle upper side, a vehicle front side, and a vehicle lower side, and is open toward the vehicle rear side (see FIG. 2). Accordingly, in the present exemplary embodiment, the cowl reinforcement 30 can be inserted into the extension portion 62 from the vehicle width direction inner side or from the vehicle rear side. Moreover, as illustrated in FIG. 2, the cowl reinforcement 30 is fixed to the extension portion 62 by welding in a state in which an outer wall face of a wall 32 of the cowl reinforcement 30 has been abutted against an inner wall face of the extension portion 62. Accordingly, arc-welded weld portions T2 are formed at steps formed by the outer wall face of the wall 32 and end faces of the extension portion 62. Note that the extension portion 62 that has a U-shaped cross-section profile is not limited to having a profile opening toward the vehicle rear side as in the present exemplary embodiment. For example, the extension portion 62 may have a profile opening toward any out of the vehicle front side, the vehicle upper side, or the vehicle lower side.

As illustrated in FIG. 1 and FIG. 2, the cowl top panel 22 is a member with an open cross-section structure, and extends in the vehicle width direction along a lower portion of the windshield glass 20. The cowl top panel 22 includes a lower flange 22A that is joined to the cowl reinforcement 30, and an upright portion 22B that extends from a vehicle front end of the lower flange 22A toward the windshield glass 20 (vehicle upper side). The cowl top panel 22 also includes a mount 22C that extends from a vehicle upper end of the upright portion 22B toward the vehicle front, and that is bent toward the vehicle downward direction at a vehicle front end. The mount 22C is formed as a support portion for the windshield glass 20. The cowl top panel 22 also includes a front flange 22D that extends from a vehicle front and vehicle lower end of the mount 22C toward the vehicle front. The front flange 22D forms a portion that is joined to a reinforcement panel 24 (see FIG. 2), described later.

As illustrated in FIG. 2, the cowl top panel 22 is provided with a fixing portion 26 and cushioning rubber 28 at a vehicle upper side face of the mount 22C. The fixing portion 26 is configured by a pliable and elastic adhesive such as a urethane adhesive, and is provided around a periphery of the windshield glass 20. In the above manner, the windshield glass 20 is supported by the cowl top panel 22 through the fixing portion 26 and the cushioning rubber 28.

The reinforcement panel 24 is joined to the cowl top panel 22 at plural locations in the vehicle width direction. The reinforcement panel 24 is configured including a rear flange 24A extending in the vehicle vertical direction at the vehicle rear, and a front flange 24B extending in the vehicle front-rear direction at the vehicle front. The rear flange 24A is abutted against the upright portion 22B of the cowl top panel 22, and the rear flange 24A and the upright portion 22B are fixed together by spot welding (see the weld point W1 in FIG. 2). The front flange 24B is abutted against the front flange 22D of the cowl top panel 22, and the front flange 24B and the front flange 22D are fixed together by spot welding (see the weld point W2 in FIG. 2).

As illustrated in FIG. 1 and FIG. 2, the cowl reinforcement 30 is a member that extends in the vehicle width direction and has a closed cross-section structure. The cowl reinforcement 30 is configured by an extruded aluminum member. A vehicle width direction outer side of the cowl reinforcement 30 is joined to the joining member 60 configuring the front pillar 50, a vehicle upper side of the cowl reinforcement 30 is joined to the cowl top panel 22, and a vehicle lower side of the cowl reinforcement 30 is joined to the dash panel 40.

The lower flange 22A of the cowl top panel 22 is fixed to a vehicle upper side face of the cowl reinforcement 30 by rivets 36. The wall 32 and the extension portion 62 of the joining member 60 are joined together in an overlapping state at a vehicle width direction outer side end of the cowl reinforcement 30 (see FIG. 2). Accordingly, the lower flange 22A of the cowl top panel 22 is abutted against a vehicle upper side face of the wall 32 at a vehicle width direction inner side of the extension portion 62, and is abutted against a vehicle upper side face of the extension portion 62 at the portion where the wall 32 and the extension portion 62 overlap each other. Namely, at the portion where the wall 32 and the extension portion 62 overlap each other, the cowl top panel 22 is joined to the cowl reinforcement 30 together with the joining member 60. Note that the method for joining the cowl reinforcement 30 and the cowl top panel 22 together is not limited to the rivets 36. For example, a joining method employing bolts or welding may be applied.

An upper flange 40A, provided at a vehicle upper side end of the dash panel 40, is fixed to a vehicle lower side face of the cowl reinforcement 30 by bolts 38. The upper flange 40A of the dash panel 40 is abutted against a vehicle lower side face of the wall 32 at the vehicle width direction inner side of the extension portion 62, and is abutted against a vehicle lower side face of the extension portion 62 at the portion where the wall 32 and the extension portion 62 overlap each other. Namely, at the portion where the wall 32 and the extension portion 62 overlap each other, the dash panel 40 is joined to the cowl reinforcement 30 together with the joining member 60. Note that the method for joining the cowl reinforcement 30 and the dash panel 40 together is not limited to the bolts 38. For example, a joining method employing rivets or welding may be applied.

The vehicle front section structure 18 in which the various members are joined as described above are coated with a sealant S at each joining portion, thereby preventing water and the like from penetrating through from the front vehicle compartment 12 to the vehicle cabin 14.

Operation and Advantageous Effects

Next, explanation follows regarding operation and advantageous effects of the present exemplary embodiment, while drawing comparison with a comparative example.

As illustrated in FIG. 2, the vehicle front section structure 18 of the present exemplary embodiment is configured by, in sequence from the top of the vehicle downward, the cowl top panel 22 that has an open cross-section structure, the cowl reinforcement 30 that has a closed cross-section structure, and the dash panel 40 that has an open cross-section structure. Explanation follows regarding operation in a case in which a colliding body 80, illustrated in FIG. 2, has collided with a lower portion of the windshield glass 20.

FIG. 3 is a schematic diagram illustrating a state in which a colliding body 80 such as the head of a pedestrian has collided with the lower portion of the windshield glass 20. As illustrated in FIG. 3, when the colliding body 80 collides with the lower portion of the windshield glass 20, in the cowl section 16, a collision load F toward the vehicle lower side is input to the cowl top panel 22 through the fixing portion 26 and the cushioning rubber 28. As described above, the cowl top panel 22 has a closed cross-section at the location where the cowl top panel 22 is joined to the reinforcement panel 24, and has an open cross-section at locations where the cowl top panel 22 is not joined to the reinforcement panel 24. By contrast, the cowl reinforcement 30 to which the cowl top panel 22 is fixed is configured by an extruded aluminum member with a closed cross-section structure across its entire vehicle width direction range. Namely, in the cowl section 16, the cowl top panel 22 has lower rigidity than the cowl reinforcement 30, and so if excessive collision load F is borne by the cowl section 16, the cowl top panel 22 undergoes compression deformation in the vehicle vertical direction. Namely, collision energy can be absorbed over the distance from the windshield glass 20 to the cowl reinforcement 30. A collision reaction force input to the colliding body 80 from the cowl section 16 side is thereby reduced.

Comparative Example 1

Figure 4:
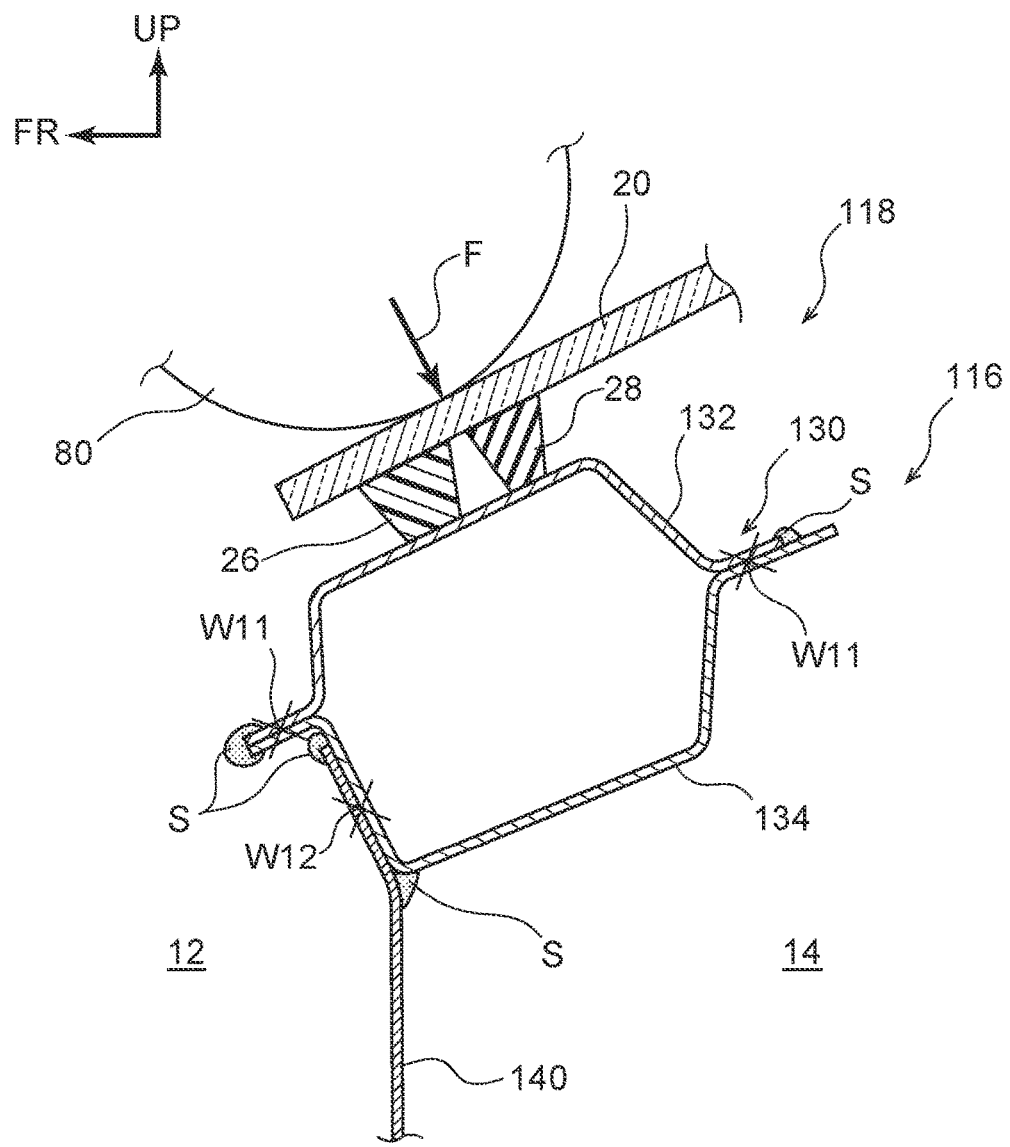
FIG. 4 is a side view cross-section illustrating a cowl section of a vehicle front section structure according to a Comparative Example 1.

Comparative Example 1 is an example of a vehicle front section structure in which, as described in JP-A No. 2004-299633, a cowl reinforcement is disposed at a vehicle upper end of a cowl section, and windshield glass is supported directly by the cowl reinforcement. FIG. 4 illustrates the structure in the vicinity of a cowl section 116 in a vehicle front section structure 118 of Comparative Example 1. Configurations equivalent to those of the present exemplary embodiment are allocated the same reference numerals. The cowl section 116 of Comparative Example 1 extends in the vehicle width direction, and includes a cowl reinforcement 130 that supports the windshield glass 20.

The cowl reinforcement 130 is a framework member formed by joining a cowl upper panel 132 that has a hat-shaped cross-section profile, and cowl lower panel 134 that has a hat-shaped cross-section profile, together by spot welding (see weld points W11). The cowl reinforcement 130 has a closed cross-section. The windshield glass 20 is supported by the cowl upper panel 132 through the fixing portion 26 and the cushioning rubber 28. Moreover, a dash panel 140 extending in the vehicle vertical direction is joined to a vehicle front side of the cowl lower panel 134 by spot welding (see weld point W12). Joining portions between the respective members are coated with the sealant S, preventing water and the like from penetrating through from the front vehicle compartment 12 to the vehicle cabin 14.

In Comparative Example 1, the cross-sectional area of the cowl reinforcement can be made larger than in the present exemplary embodiment since only the cowl reinforcement 130 is present at the vehicle upper side in the cowl section 116. Accordingly, Comparative Example 1 enables rigidity of the vehicle to be secured even if the cowl reinforcement 130 is a framework structure configured by combining together steel panels. However, in Comparative Example 1, when the colliding body 80 collides with the lower portion of the windshield glass 20, almost all of the collision load F from the colliding body 80 is applied to the cowl reinforcement 130. Collision energy absorption performance is thus inferior to that of the present exemplary embodiment. Namely, improving pedestrian protection performance becomes difficult.

Comparative Example 2

Figure 5:
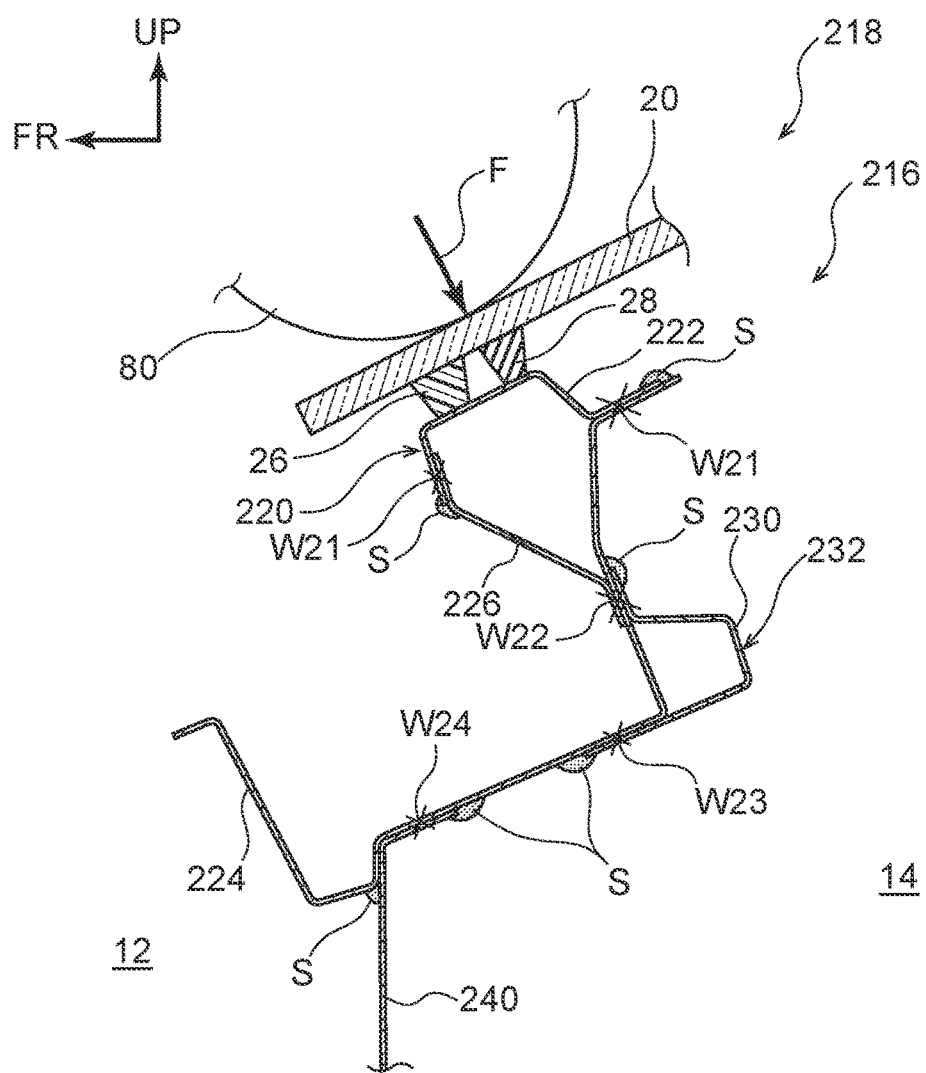
FIG. 5 is a side view cross-section illustrating a cowl section of a vehicle front section structure according to a Comparative Example 2.

Comparative Example 2 is an example of a vehicle front section structure in which, as described in JP-A No. 2009-90928, a closed cross-section portion is provided by joining a cowl lower panel and a cowl upper panel together such that local portions thereof have a closed cross-section, and the closed cross-section portion is joined to a vehicle upper side of cowl reinforcement. FIG. 5 illustrates the structure in the vicinity of a cowl section 216 of a vehicle front section structure 218 of Comparative Example 2. Configurations equivalent to those of the present exemplary embodiment are allocated the same reference numerals. The cowl section 216 of Comparative Example 2 extends in the vehicle width direction, and includes a closed cross-section portion 220 that supports the windshield glass 20, and a cowl reinforcement 230 that is joined to a vehicle lower side of the closed cross-section portion 220.

The closed cross-section portion 220 is a framework member formed by joining a cowl upper panel 222, a cowl lower panel 224, and reinforcement panels 226 together by spot welding (see weld points W21, W22). The closed cross-section portion 220 has a closed cross-section. Note that the reinforcement panels 226 are provided at plural vehicle width direction locations in the closed cross-section portion 220. Namely, there is an open cross-section at locations where the reinforcement panels 226 are not present. Note that the windshield glass 20 is supported by the cowl upper panel 222 through the fixing portion 26 and the cushioning rubber 28. Moreover, the cowl reinforcement 230 is joined to a vehicle lower side of the closed cross-section portion 220 at the vehicle rear of the cowl lower panel 224 by spot welding (see weld points W22, W23) to form the closed cross-section portion 232. A dash panel 240 extending in the vehicle vertical direction is joined to the vehicle lower side of the cowl lower panel 224 by spot welding (see weld point W24). Joining portions between the respective members are coated with the sealant S, preventing water and the like from penetrating through from the front vehicle compartment 12 to the vehicle cabin 14.

In Comparative Example 2, the closed cross-section portion 220 that has local portions with open cross-section is provided to the cowl section 216. The cowl section 216 is formed such that the closed cross-section portion 220 is capable of undergoing compression deformation in the vehicle vertical direction under the collision load F from the colliding body 80 when the colliding body 80 collides with the lower portion of the windshield glass 20. This thereby enables collision energy absorption performance to be secured similarly to in the present exemplary embodiment, thereby enabling pedestrian protection performance to be improved. However, although in Comparative Example 2 the closed cross-section portion 232 is formed by the cowl reinforcement 230 at the vehicle lower side of the closed cross-section portion 220, it is difficult to secure a large cross-sectional area for the closed cross-section portion 232 while attempting to suppress the closed cross-section portion 232 from projecting out toward the front vehicle compartment 12 or toward the vehicle cabin 14. This means that it is difficult to improve rigidity of the vehicle in a framework structure configured by combining together steel panels.

SUMMARY

As described above, when the effects of the comparative examples are compared against the present exemplary embodiment, Comparative Example 1 is capable of securing rigidity of the vehicle, but cannot easily improve pedestrian protection performance, and Comparative Example 2 is capable of improving pedestrian protection performance, but cannot easily secure vehicle rigidity.

By contrast, in the present exemplary embodiment, the cowl reinforcement 30 is specialized so as to function as a framework member. In particular, by configuring the cowl reinforcement 30 from an extruded aluminum member, cross-sectional area is easier to secure than in cases in which steel panels are combined together, thereby enabling body rigidity to be improved. Moreover, in the present exemplary embodiment, the cowl top panel 22 is specialized in function as a face that carries the windshield glass 20. In particular, configuring the cowl top panel 22 with an open cross-section structure enables the cowl top panel 22 to undergo compression deformation when the collision load F acts on the windshield glass 20 in the vehicle downward direction. This thereby enables collision energy to be absorbed over the distance from the windshield glass 20 to the cowl reinforcement 30. Due to the above, the present exemplary embodiment enables pedestrian protection performance to be improved while also securing body rigidity. Namely, the present exemplary embodiment is capable of both securing body rigidity and improving pedestrian protection performance, something that the comparative examples are not capable of.

Moreover, the cowl top panel 22 and the cowl reinforcement 30 of the present exemplary embodiment have a split structure, facilitating adjustment of a frame portion to mount the windshield glass 20. Namely, this enables positioning precision to be raised when mounting the windshield glass.

The present exemplary embodiment also exhibits the following advantageous effects in comparison to the comparative examples. In both Comparative Example 1 and Comparative Example 2, dividing walls and framework are formed by spot welding steel panels. This consequently increases the mass of the cowl section. In particular, Comparative Example 2 includes a large number of components, thus increasing the mass. Moreover, an increased number of join locations between members (panels) results in an increase in the coating amount of the sealant S. By contrast, the cowl section 16 of the present exemplary embodiment has a basic structure configured by combining the cowl reinforcement 30 and the cowl top panel 22, requiring fewer components than the comparative examples. Moreover, the framework member configured by the cowl reinforcement 30 is made of aluminum, which has a lighter specific weight than steel, thereby enabling a reduction in weight to be achieved. Moreover, a closed cross-section is configured by an extruded aluminum member, enabling the number of join locations between members to be reduced in comparison to when a closed cross-section structure is obtained by combining panels together. Namely, the coating amount of the sealant S can be reduced.

In the present exemplary embodiment, the vehicle width direction ends of the cowl reinforcement 30 are joined to the die-cast aluminum joining members 60 configuring the front pillars 50. Namely, in the present exemplary embodiment, load acting on the cowl reinforcement 30 can be borne by the die-cast aluminum joining member 60. This thereby enables the load borne by the cowl reinforcement to be better dispersed into the front pillar than in cases in which cowl reinforcement is joined to a front pillar formed simply by combining panels together.

Moreover, the joining member 60 of the present exemplary embodiment includes the extension portion 62 that extends toward the vehicle width direction inner side and has a U-shaped cross-section profile. The wall 32 of the cowl reinforcement 30 is fixed to the extension portion 62 in an abutted state. In the present exemplary embodiment, providing a portion where the cowl reinforcement 30 and the joining member 60 overlap at the joining portion between the cowl reinforcement 30 and the joining member 60 enables deformation to be suppressed at the joining portion, where load is liable to concentrate.

Note that in the present exemplary embodiment, the cowl reinforcement 30 is inserted into the extension portion 62 of the joining member 60. More specifically, the outer wall face of the cowl reinforcement 30 is fixed to the inner wall face of the extension portion 62 in an abutted state. However, there is no limitation thereto, and the extension portion 62 may be inserted into the cowl reinforcement 30. Namely, configuration may be made in which an outer wall face of the extension portion 62 is fixed in a state abutted against an inner wall face of the cowl reinforcement 30.

Supplementary Explanation

Figure 6:
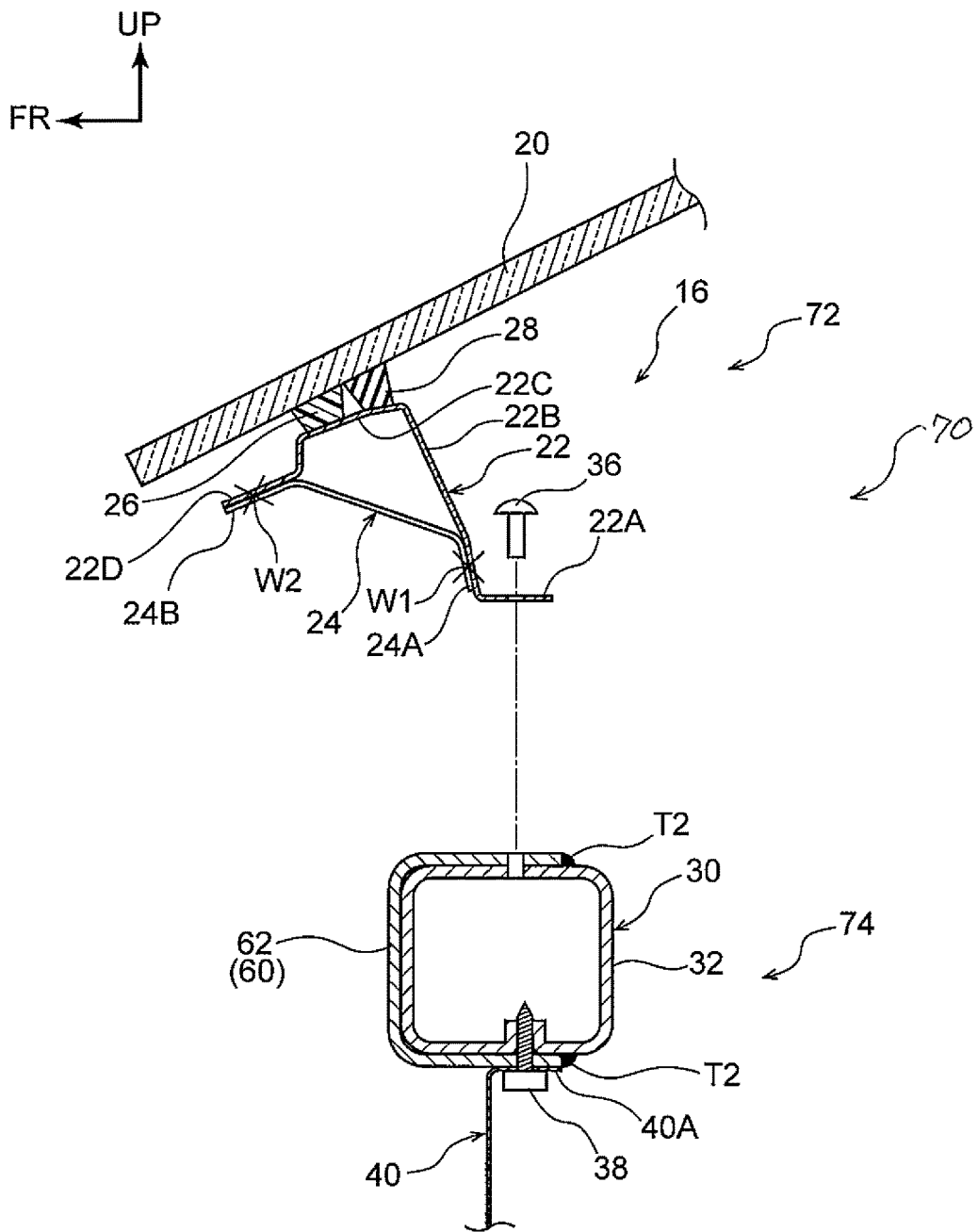
FIG. 6 a side view cross-section illustrating an example in which a vehicle front section structure according to an exemplary embodiment of the present disclosure has been applied to a vehicle configured by vehicle body modules.

The vehicle front section structure 18 of the present exemplary embodiment may be applied to a vehicle (vehicle body modular structure) configured including plural vehicle body modules. For example, the vehicle front section structure 18 may be applied in the following manner to a vehicle configured by an underside module formed from a floor module, a front module, and a rear module, and a roof module joined to the vehicle upper side of the underside module. FIG. 6 illustrates an example of a vehicle body modular structure 70. As illustrated in FIG. 6, a roof module 72 is provided in advance with the cowl top panel 22, and an underside module 74 is provided in advance with the cowl reinforcement 30. In such a configuration, by joining the roof module 72 and the underside module 74 together, the cowl section 16 can be formed at the same time. Note that the windshield glass 20 may be mounted to the roof module 72 in advance, or may be mounted after the roof module 72 and the underside module 74 have been joined together.

As illustrated in FIG. 1, each of the front pillars 50 of the present exemplary embodiment is formed by inserting the front pillar upper 52 into the vehicle upper side opening of the joining member 60, and inserting the front pillar lower 54 into the vehicle lower side opening of the joining member 60. Moreover, in the present exemplary embodiment, the joining member 60 is made from die-cast aluminum, thereby enabling the front pillar upper 52, the front pillar lower 54, and moreover the cowl reinforcement 30 to be fixed together firmly. Note that the joining member 60 may be provided with dividing walls (ribs) to partition the joining member 60 at a vehicle vertical direction central portion into upper and lower parts. This thereby enables the rigidity of the joining member 60 to be further improved.

What is claimed is:

1. A vehicle front section structure comprising:
    a cowl top panel that extends in a vehicle width direction along a lower portion of a windshield glass, that supports the windshield glass, and that has an open cross-section structure;
    a cowl reinforcement that is joined to both a lower portion of the cowl top panel and an upper portion of a dash panel, that extends in the vehicle width direction, and that has a closed cross-section structure; and
    a joining member that configures a front pillar, that is joined to a vehicle width direction end of the cowl reinforcement, and that is made from die-cast aluminum.

2. The vehicle front section structure of claim 1, wherein the cowl reinforcement is configured by an extruded aluminum member.

3. The vehicle front section structure of claim 1, wherein:
    the joining member includes an extension portion extending toward a vehicle width direction inner side and having a U-shaped cross-section profile; and
    a wall of the cowl reinforcement is fixed to the extension portion in an abutted state.

4. The vehicle front section structure of claim 3, further comprising a weld portion at a step formed by the wall of the cowl reinforcement and an end face of the extension portion.

5. The vehicle front section structure of claim 1, wherein:
    the front pillar includes a pillar upper extending in a vehicle vertical direction and a pillar lower extending in the vehicle vertical direction;
    the pillar upper is fixed to the joining member in a state in which the pillar upper is inserted into an opening at a vehicle upper side of the joining member; and
    the pillar lower is fixed to the joining member in a state in which the pillar lower is inserted into an opening at a vehicle lower side of the joining member.

6. The vehicle front section structure of claim 1, wherein the cowl top panel includes:
    a lower flange that is joined to the cowl reinforcement;
    an upright portion that extends from a vehicle front end of the lower flange toward the windshield glass; and
    a mount that extends from a vehicle upper end of the upright portion toward a vehicle front.

7. A vehicle body modular structure comprising the vehicle front section structure of claim 1, wherein:
    the vehicle body modular structure includes a roof module including the cowl top panel and an underside module including the cowl reinforcement, as a plurality of vehicle body modules configuring a vehicle body; and
    a cowl section including the cowl top panel and the cowl reinforcement is formed by joining the roof module and the underside module together.

8. A vehicle front section structure comprising:
    a cowl top panel that extends in a vehicle width direction along a lower portion of a windshield glass, that supports the windshield glass, and that has an open cross-section structure; and
    a cowl reinforcement that is joined to both a lower portion of the cowl top panel and an upper portion of a dash panel, that extends in the vehicle width direction, and that has a closed cross-section structure, wherein
    the vehicle body modular structure includes a roof module including the cowl top panel and an underside module including the cowl reinforcement, as a plurality of vehicle body modules configuring a vehicle body, and
    a cowl section including the cowl top panel and the cowl reinforcement is formed by joining the roof module and the underside module together.

* * * * *